US012505629B1

(12) United States Patent
Vorobiov et al.

(10) Patent No.: US 12,505,629 B1
(45) Date of Patent: Dec. 23, 2025

(54) MODEL-BASED AUGMENTED IMAGE GENERATION

(71) Applicant: Amazon Technologies, Inc., Seattle, WA (US)

(72) Inventors: Oleksandr Vorobiov, Albstadt (DE); Wei-Lin Hsiao, Seattle, WA (US); Nicolas Heron, New York, NY (US); Apoorv Chaudhri, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 200 days.

(21) Appl. No.: 18/541,380

(22) Filed: Dec. 15, 2023

(51) Int. Cl.
*G06T 19/00* (2011.01)
*G06T 7/50* (2017.01)
*G06T 7/73* (2017.01)

(52) U.S. Cl.
CPC .............. *G06T 19/006* (2013.01); *G06T 7/50* (2017.01); *G06T 7/73* (2017.01); *G06T 2207/20021* (2013.01); *G06T 2207/20088* (2013.01); *G06T 2207/30196* (2013.01); *G06T 2210/16* (2013.01)

(58) Field of Classification Search
None
See application file for complete search history.

(56) References Cited

U.S. PATENT DOCUMENTS

2023/0086880 A1* 3/2023 Li .............................. G06T 7/10
345/646

OTHER PUBLICATIONS

Kuppa, Gaurav, et al. "Shineon: Illuminating design choices for practical video-based virtual clothing try-on." Proceedings of the IEEE/CVF Winter Conference on Applications of Computer Vision. 2021. (Year: 2021).*
Wang, Zheng, et al. "FW-VTON: Flattening-and-Warping for Person-to-Person Virtual Try-on." arXiv preprint arXiv:2507.16010 (2025). (Year: 2025).*
Liu, Yu, et al. "SwapGAN: A multistage generative approach for person-to-person fashion style transfer." IEEE Transactions on Multimedia 21.9 (2019): 2209-2222. (Year: 2019).*
Shen, Le, et al. "MFP-VTON: Enhancing Mask-Free Person-to-Person Virtual Try-On via Diffusion Transformer." arXiv preprint arXiv:2502.01626 (2025). (Year: 2025).*
Zhang, Nannan, et al. "ViTon-GUN: Person-to-Person Virtual Try-on via Garment Unwrapping." IEEE Transactions on Visualization and Computer Graphics (2025). (Year: 2025).*

(Continued)

*Primary Examiner* — Ryan M Gray
(74) *Attorney, Agent, or Firm* — Kilpatrick Townsend & Stockton LLP

(57) ABSTRACT

Techniques are described herein for generating a virtual try-on augmented image. An example method can include A system can access a first two-dimensional model of a target garment. The system can determine a first plurality of shape keypoints for a first part of the first plurality of parts of the image. The system can access a second two-dimensional image of a first user. The system can determine a second plurality of keypoints for a second part of the second plurality of parts of the second two-dimensional image, a second number of the second plurality of keypoints based at least in part on a second predetermined number of keypoints associated with the second part. The system can generate a rendered augmented image of the target garment on the target user.

20 Claims, 13 Drawing Sheets

(56) References Cited

OTHER PUBLICATIONS

Xie, Zhenyu, et al. "Towards scalable unpaired virtual try-on via patch-routed spatially-adaptive gan." Advances in Neural Information Processing Systems 34 (2021): 2598-2610. (Year: 2021).*
Zhu, L. et al., "TryOnDiffusion: A Tale of Two UNets", arXiv:2306.08276 [cs. CV], Jun. 14, 2023, 30 pages.
Ye, H. et al., "IP-Adapter: Text Compatible Image Prompt Adapter for Text-to-Image Diffusion Models", arXiv:2308.06721 [cs.CV], Aug. 13, 2023, 16 pages.

* cited by examiner

1200 ⬊

Receive, at a machine learning model of a computing system, a query vector generated based at least in part on a first shape keypoint of a first plurality of shape keypoints associated with a first user image 1202

Receive, at the machine learning model of the computing system, a key vector generated based at least in part on the first shape keypoint 1204

Arrange, by the first machine learning model of the computing system, a pixel associated with the first keypoint on an image of first user using a cross-attention mechanism based at least in part on the query vector and the key vector 1206

Compare, by the computing system, an arrangement of the pixel to a ground truth arrangement of the pixel using a loss function 1208

Adjust, by the computing system, a first weight of the first machine learning model based at least in part on the loss function 1210

FIG. 12

MODEL-BASED AUGMENTED IMAGE GENERATION

BACKGROUND

A computing system may be used to provide a virtual view of how a certain article of clothing may look on different people of various sizes. For example, a computing system may be configured to identify an article of clothing (e.g., a portion of the image) from an image that includes a person wearing the article of clothing and adapt the article of clothing portion of the image to "fit" on an image of a different person.

BRIEF DESCRIPTION OF THE DRAWINGS

Various embodiments in accordance with the present disclosure will be described with reference to the drawings, in which:

FIG. 12 is an example process flow for training a machine learning model to generate an augmented image, according to embodiments of the present disclosure.

DETAILED DESCRIPTION

Figure 1:
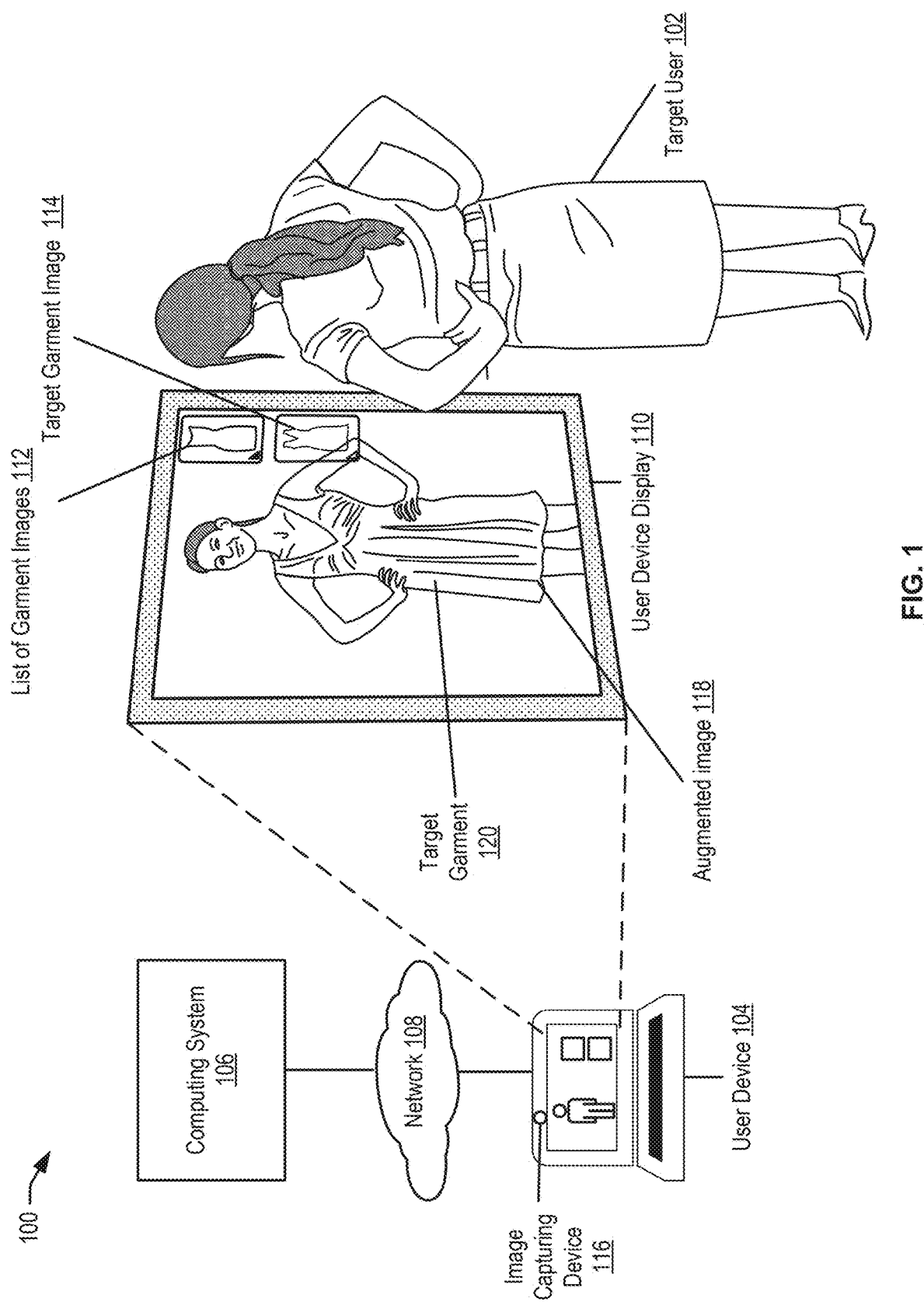
FIG. 1 is an illustration of an example virtual try-on system, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a computing system that can render an image of an article of clothing onto an image of a person. For example, the computing system can receive an image of a first person wearing a target article of clothing and an image of a second person. The computing system can use machine learning techniques to determine characteristics of the article of clothing based on the image of the article of clothing. Based on the image, the computing system can identify a pose of the first person wearing the clothing. The pose can help determine whether the article of clothing is, for example, front-facing, side-facing, back-facing, or in another pose. The computing system can also identify various points of interest on the article of clothing. The points of interest can include, for example, points across a torso of a shirt to provide body mass dimensions. The computing system can also use machine learning techniques to determine physical characteristics, including spatial dimensions of the second person as displayed in the image of the second person. For example, the computing system can use the machine learning techniques to generate a three-dimensional model of the second person based on the image. Based on the three-dimensional model, the computing system can identify a pose of the second person. The pose can identify whether the second person is, for example, front-facing, side-facing, back-facing, or in another pose. The computing system can also identify various points of interest on the person. The points of interest can include, for example, points across the person's waist to provide information on the size of the waist. The computing system can then generate an augmented image that includes the second person wearing the target article of clothing. For example, the computing system can access a diffusion model that is trained to generate an image of clothing onto an image of a person. The computing system can further provide the diffusion model the image of the second person and the physical characteristics of the article of clothing. The diffusion model can create an image of the second person wearing the article of clothing. The computing system can then display the augmented image for the person to view.

Turning now to a particular example, in this example, a user can use a user device to interact with a computing system (e.g., a backend server that implements aspects of a virtual try-on system). For example, the user can use their user device to access the virtual try-on system via an application or website. The user can further use the application or website to enter filters, such as type, brand name, price range, and color on the website, and the virtual-try on system can return articles of clothing images based on the filters. The computing system can obtain the articles of clothing images from a database. A user can use their user device to select an image of an article of clothing from a list of images of articles of clothing. For this example, the selected image of the article of clothing can be a shirt image.

The computing system can use machine learning techniques to determine physical characteristics of the shirt as displayed in the shirt image. For example, the computing system can use the machine learning techniques to extract features from the shirt image to determine the characteristics.

The user can provide a user image of the user (e.g., a selfie or other image of the user's body) to the computing system via the user device. The computing system can use machine learning techniques to determine physical characteristics, including spatial dimensions of the user as displayed in the user image. For example, the computing system can use the machine learning techniques to generate a three-dimensional model (e.g., DensePose-based model or SMPL model) of the user based on the user image. Based on the three-dimensional model, the computing system can identify a pose of the user. For example, the computing system can use a machine learning model trained for pose estimation to determine pose keypoints, where pose keypoints are identified at various joints (e.g., shoulder, elbow). The pose keypoints can be used to identify the pose of the user.

The computing system can further segment the user image into parts. The computing system can also use the segmented user image to identify various shape keypoints at each part. The number of shape keypoints at each part to be identified and be pre-determined. The shape keypoints can be points of interest that the computing system can use to implicitly guide the generation of the image of the shirt onto the image of the user. For example, shape keypoints can be keypoints across the user's chest, and can provide the width of the chest. The computing system can use this information to generate an image of a shirt that has the same width as the width of the chest in the user image. In some embodiments, the user can further manually input a user-based input, such as the user's body and clothing-related dimensions (e.g., height, weight, neck size, shoulder width, chest, waist, hips, sleeve length, jacket length, inseam, outseam, waist, thigh, knee, and other related clothing size dimensions) into the computing system via a user device.

If the user did manually input a user-based input, such as clothing-related dimensions, the computing system can use these measurements in addition to, or as an alternative to, any measurements determined based on the pose information of the user or shape keypoints of the user. The computing system can process the user image to remove any shirt that the user is wearing. The computing system can further add data depicting the shirt onto the user image. The image of the user wearing the shirt may be referred to as an augmented image because the image is a combination of an image of the user together with a computer-generated image of the shirt. The computing system can then display, via the user device, the augmented image for the user.

Embodiments of the present disclosure provide several technical advantages over conventional virtual try-on techniques. For example, the techniques described herein encode shape and size information in both of an image of a target user and an image of a target garment. By doing so, the techniques described herein may enable a more realistic representation of how the target garment will look on the target user, as compared to conventional approaches. This is at least because conventional approaches use a sparse set of keypoints at the contour of the clothing and a sparse set of keypoints at the contour of the user. The sparse set of keypoints at the contour does not provide shape or size information. For example, the distance between the hips of a smaller person and a larger person may be negligible. If a computing system only has keypoints at the hips, the computing system may generate a pants image for the smaller person that is relatively the same as a pants image for the larger person. The shape and size information would be not fully conveyed by the keypoints at the hips.

This techniques described herein can identify shape keypoints across a user image and a garment image. For example, the computing system can segment a user image and a garment image into respective parts. Each part can be associated with a respective pre-determined number of shape keypoints. The computing system can identify shape keypoints at parts for the garment image and the user image. Furthermore, the shape keypoints may be arranged across a user's body and across a garment and not merely at the contour. These shape keypoints can implicitly guide a machine learning model to generate an image of the target garment onto the user image. The shape keypoints provide shape and size information that may be lost if only points at the contour are used.

The technical advantages extend to reducing processing requirements. The techniques described herein can use a cross-attention mechanism to guide the computing system to focus on various points of the user image and the clothing image. Without the cross-attention mechanism, the computing system may focus on irrelevant details of either the user image or the garment image. By focusing on irrelevant details, the computing system can spend more processing time generating, a perhaps inaccurate, image of the user wearing the garment. The herein described techniques provide the computing system with shape keypoints and use the cross-attention mechanism to guide the augmented image generation process. Therefore, the computing system can focus on the relevant details of the user image and the garment image to generate a realistic image of the user wearing the clothing more quickly.

FIG. 1 is an example virtual try-on system 100, according to embodiments of the present disclosure. As illustrated, a target user 102 may interact with a user device 104 (e.g., laptop, tablet, smartphone). The user device 104 can be connected to a computing system 106 (e.g., a cloud datacenter) via a network 108. The user device 104 can include a user device display 110 (e.g., laptop display, tablet display, smartphone display). The user device 104 can include a peripheral device, such as a keyboard, and the user device display 110 can be a touchscreen display for interacting with the computing system 106. The target user 102 can enter information into the peripheral device or the touchscreen to enter one or more filters for desired garment characteristics (e.g., type, brand name, price range, color, etc.). The computing system 106 can receive the filters via the network 108. The computing system 106 can access a database of garments and retrieve a list of garment images 112 for the target user 102 based on the filters. In some embodiments, the list of garment images 112 can be marketing images generated by the garment manufacturers. The target garment manufacturers can further provide garment information that can be used by the computing system. A reference user (e.g., a fashion model) can be wearing the garment in the garment images. For example, the target user may indicate that the desired garment characteristics includes a one-piece dress for under $150.00. The computing system 106 can cause the user device display 110 to display candidate garments that are each one-piece dresses for under $150.00. For example, the target user 102 may be accessing the computing system 106 via an application executing on the user device 104, and the computing system 106 may cause the list of garment images 112 to be displayed on the user device display 110 via the application. The target user 102 can use the peripheral device or touch screen to select one of the garments in the list of garment images 112 as the target garment image 120. As illustrated, the target user 102 may be wearing a different garment than the target garment 120. In FIG. 1, the target user 102 may be wearing a shirt, skirt, and a belt around her waist. On the other hand, the target garment image 114 may be a one-piece dress with straps.

The target user 102 can further provide the user device 104 a target user image (e.g., a selfie or stored image). In some embodiments, the user device 104 can include an image capturing device 116 for capturing the target user image (e.g., selfie) of the target user 102. In other embodiments, the user device 104 can include an interface that permits the target user 102 to upload the target user image (e.g., stored image). For example, the target user 102 can access their photos stored on the user device 104 and select a stored image as the target user image. The computing system 106 can receive the target user's selection of the target garment and the target user image via the network 108.

Based on the target garment image, the computing system 106 can generate a three-dimensional model of the reference user wearing the target garment (e.g., a DensePose-based model, SMPL model). The computing system 106 can use a neural network (e.g., a convolutional neural network (CNN), a recurrent neural network (RNN), a stacked hourglass network, or other appropriate neural network) to determine the pose keypoints for the reference user wearing the target garment. The pose keypoints can be arranged at various joints (e.g., a shirt elbow, a shirt shoulder, a pants hip, a pants knee). Based on the pose keypoints, the computing system 106 can determine a pose of the reference user wearing the target garment (e.g., front-facing, back-facing, side facing, or other pose).

The computing system 106 can further segment the target garment image into parts associated with anatomical body parts. The computing system 106 can access a database to determine the number of shape keypoints to identify as each part. The computing system 106 can then identify the shape keypoints at each of the parts. Each shape keypoint can be a point of interest on the target garment image 114. Each shape keypoint can further correspond to a pixel of the target garment image 114. Each shape keypoint can be defined by an intensity (i)-coordinate that include an identifier for the part. The shape keypoint can further be defined by a u-coordinate that corresponds to the x-coordinate of the pixel. The shape keypoint can further be defined by a v-coordinate that corresponds to the y-coordinate of the pixel. The computing system 106 can identify multiple shape keypoints at each part. Each shape keypoint can provide physical characteristic (e.g., shape and size) information for the reference user wearing the target garment. For example, the computing system can use the spatial location of left shoulder shape keypoints and right shoulder shape keypoints to determine the placement of the reference user's shoulders.

The computing system 106 can similarly generate a three-dimensional model, determine pose information, and identify shape keypoints based on the target user image. The computing system 106 can further process the target user image to remove a garment that corresponds to the target garment from the target user image. For example, if the target garment is a shirt and the target user 102 is wearing a shirt in the target user image, the computing system 106 can remove the shirt from the target user image. The computing system 106 can identify the parts associated with the target garment. The computing system can then identify the matching parts in the target user image. The computing system 106 can remove the pixels associated with the matching parts from the target user image.

The computing system 106 can further store the shape keypoints and pose information of the target garment image and the target user image as conditional information. The computing system 106 can use the conditional information to guide the augmented image generation process. For example, if the conditional information indicates a pose of the target user, this conditional information can act as a constraint on the computing system 106 for generating the augmented image. In this example, the shape keypoints can indicate that the target user has a muscular definition. Therefore, the computing system 106 can generate a rendered image of the target garment for a muscular person.

The computing system 106 can include a set of machine learning models for processing the target garment image 114 and the target user image. For example, the computing system 106 can access a first machine learning model, such as diffusion model, and provide the target user image to the first machine learning model. The computing system can further access a second machine learning model, such as a convolutional neural network (CNN), and provide the target garment image 114 to the second machine learning model. The second machine learning model can extract features from the target garment image and provide the features to the first machine learning model. The computing system 106 can further provide conditional information pose information for a reference user wearing the target garment, pose information for the target user, shape keypoints for the target garment, and shape keypoints for the target user to the first machine learning model. The first machine learning model can generate the augmented image 118 of the target user wearing the target garment. Furthermore, the conditional information can provide the first machine learning model with information to guide the data generation to realistically depict the target user wearing the target garment. This process is explained with more particularity with respect to FIGS. 2-4. The computing system 106 can then cause the augmented image 118 to be displayed on the user device display 110. As illustrated, the computing system 106 can generate an augmented image 118 that includes the target user 102 wearing the target garment 120.

Although FIG. 1 is described in the context of a target user image being an image of the target user 102, it should be appreciated that the augmented image 118 may be generated from user images other than images of the target user 102. For example, the user images may be stock images of reference users with different body types. The computing system can provide a list of reference user images via the user device 104. The reference user images can include images of different users of different ages. The reference user images can also include images of users of different sizes. The target user 102 can select one of the reference user images to be used to generate the augmented image 118. For example, the target user 102 can select an image of a reference user that has a similar body type as that of the target user 102. The computing system 106 can then use the selected user image to the generate the augmented image. As used herein below, a user image can include an image of the target user 102 or an image of a reference user other than the target user 102.

Figure 2:
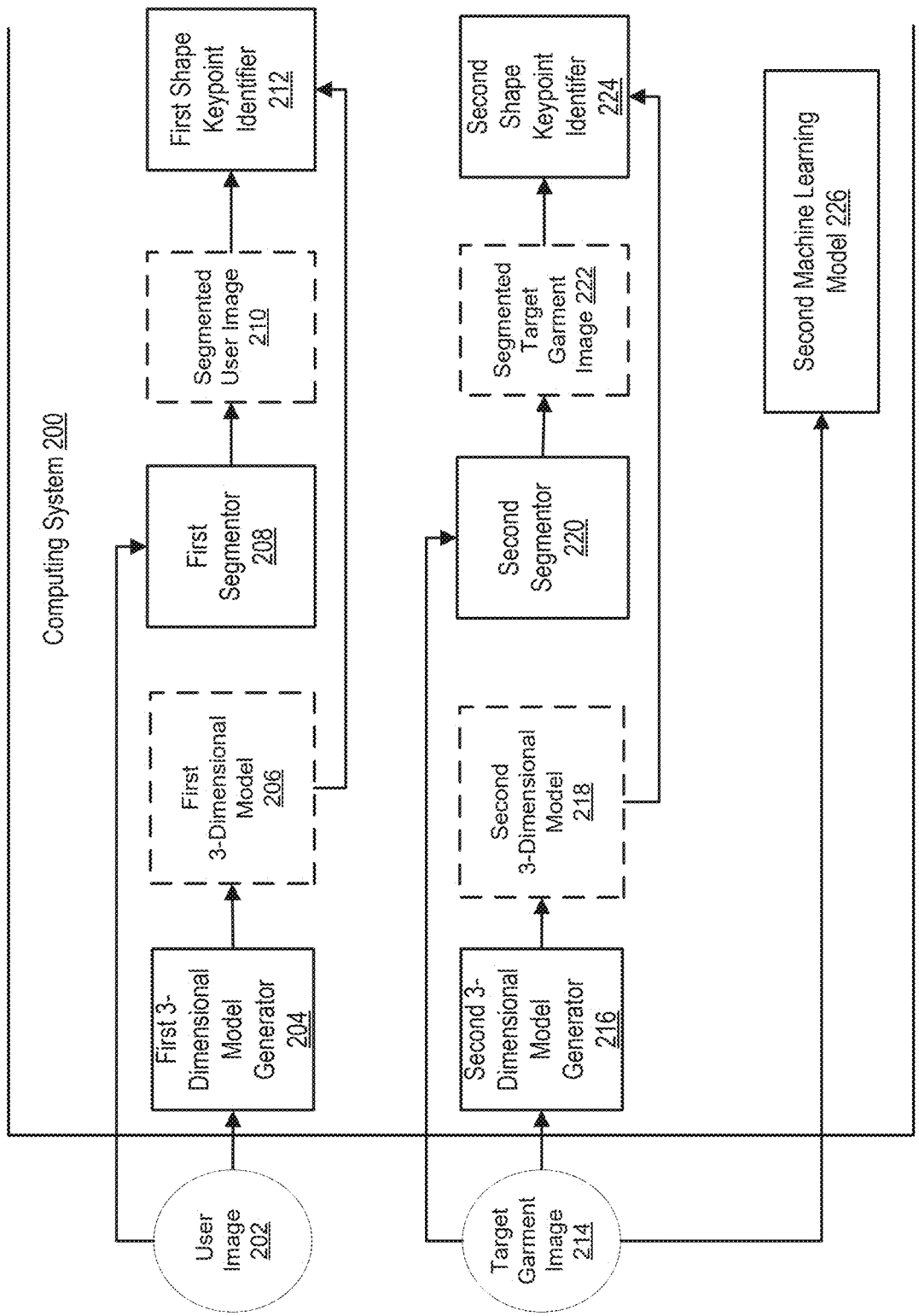
FIG. 2 is an illustration of an example computing system for generating an augmented image, according to embodiments of the present disclosure.
Figure 3:
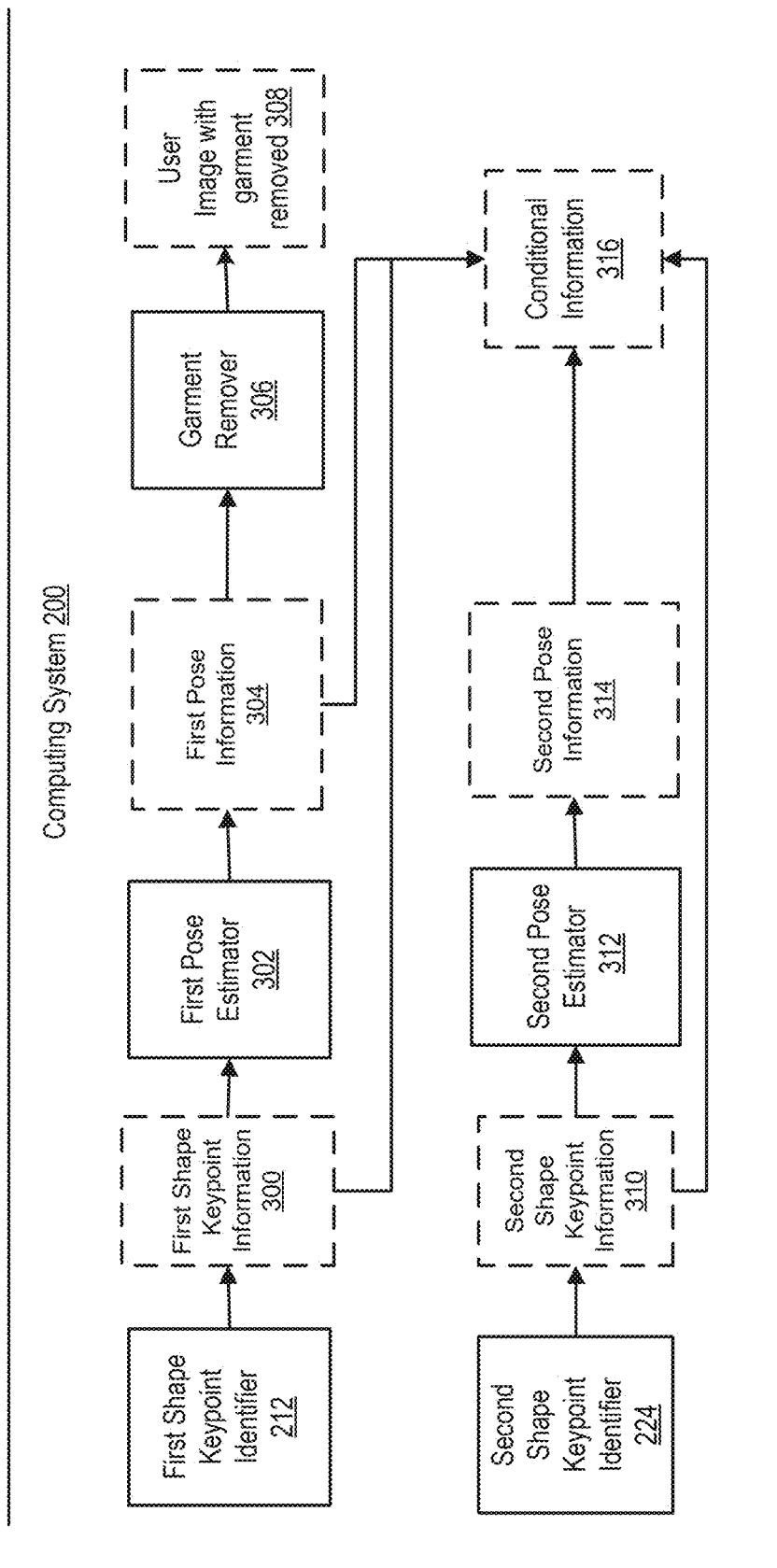
FIG. 3 is an illustration of an example computing system for generating an augmented image, according to embodiments of the present disclosure.
Figure 4:
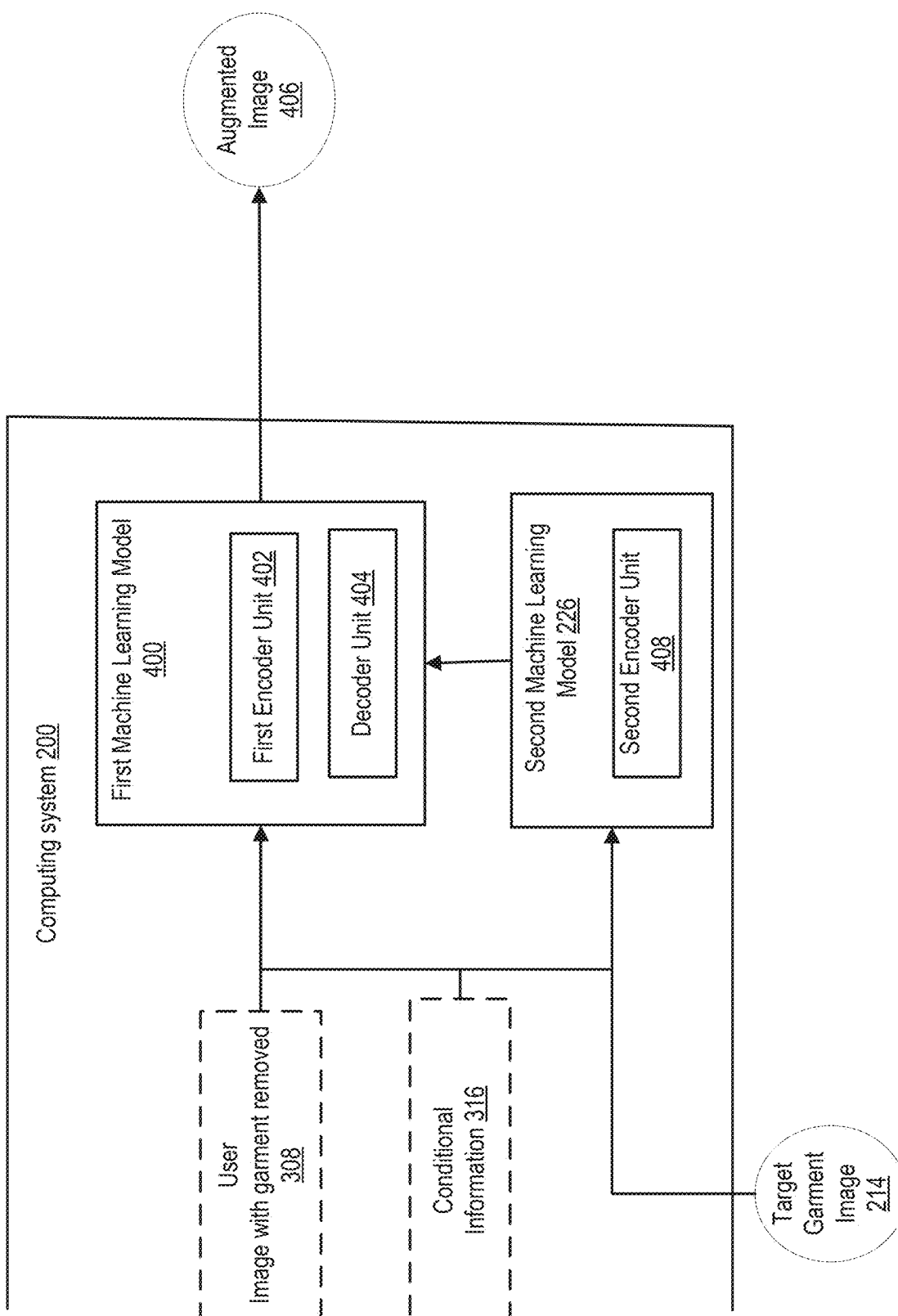
FIG. 4 is an illustration of an example computing system for generating an augmented image, according to embodiments of the present disclosure.

FIGS. 2-4 provide a description of an example computing system for generating an augmented image. The computing system 200 described in FIG. 3 can be considered a continuation of the computing system 200 described in FIG. 2. The computing system described in FIG. 4 can be considered to be a continuation of the computing system 200 described in FIG. 3. FIG. 2 is an illustration of an example computing system 200 for generating an augmented image, according to embodiments of the present disclosure. The computing system 200 (e.g., computing system 106) can receive a user image 202. The user image 202 can include an image of a target user (e.g., target user 102) wearing a garment that may not be a target garment. The user image 202 can be two-dimensional image and be received by a first three-dimensional model generator 204 of the computing system 200. The first three-dimensional model generator 204 can generate a first three-dimensional model 206 of the target user wearing the garment. The first three-dimensional model 206 can be, for example, a DensePose-based model that can describe correspondence between a two-dimensional image and a three-dimensional surface of the target user. The first three-dimensional model 206 can also be a skinned multi-person linear (SMPL) model that is a three-dimensional model of the target user's body that can describe a variety of body shapes and poses. The first three-dimensional model 206 can also be any other appropriate three-dimensional model.

The user image 202 can also be transmitted to the first segmentor 208. The first segmentor 208 can segment the user image 202 into parts to generate the segmented user image 210. In some embodiments, the first segmentor 208 can segment the into up to 24 parts for the target user and a single part for the background of the user image 202. As used herein, segmenting can include defining a boundary for one or more portions of the user image 202. For example, the first segmentor 208 can define a respective boundary for each of the parts. Consider an example, in which the first segmentor 208 associates portions of the user image 202 with different parts. A description of the different parts is provided in more detail with respect to FIG. 9. The first segmentor 208 can determine boundaries for each part. Each of the parts can be associated with an anatomical body part and the include and identifier. The parts can be standardized, such that regardless of the actual target user, the first segmentor 208 segments the target user into the same parts. The dimensions of the parts may vary based on the target user. For example, the surface area of a part for a smaller person may be less than the surface area for the same part of a larger person.

The first three-dimensional model 206 and the first segmented user image 210 can be transmitted to the first shape keypoint identifier 212. The first shape keypoint identifier 212 can identify shape keypoints for each part of the segmented user image 210. The first shape keypoint identifier 212 can access a mapping of parts to a predetermined number of shape keypoints. For example, the mapping can indicate that the first shape keypoint identifier 212 is to identify twenty-one shape keypoints. The shape keypoints can include nine shape keypoints to be identified for the torso, two shape keypoints to be identified for each arm, two shape keypoints to be identified for each front of upper leg, and two shape keypoints to be identified for each front of lower leg. As indicated above, each shape keypoint can include an i-coordinate, a u-coordinate, and a v-coordinate. The i-coordinate can be based on the part that the shape keypoint is arranged in. The u-coordinate and the v-coordinate can be based on the x-coordinate and the y-coordinate of the pixel from the two-dimensional image of the target user, such that:

$$shapeKP^k(x,y) = \text{Nearest}((i,u,v)),$$

where $shapeKP^k(x, y)$ can equal the k-th shape keypoint associated with pixel coordinates (x, y). As used herein, the Kth shape keypoint can be the current shape keypoint that the first shape keypoint identifier 212 is identifying. "Nearest" can be the nearest in distance shape keypoint in (x, y) given a defined coordinates (i, u, v). For example, if distance of the shape keypoint to each pixel of the two-dimensional image were to be determined, the nearest shape keypoint with coordinates (i, u, v) would have the shortest distance to the pixel with coordinates (x, y).

The arrangement of the shape keypoints on the segmented user image 210 may not be rigidly defined. Rather, the first shape keypoint identifier 212 may define an isoband across the segmented user image 210 in a u-coordinate. The isoband can be considered a horizontal line across a contour of a cell of a mesh network overlaid on the segmented user image 210. The first shape keypoint identifier 212 can further identify the minimum and maximum values of the isoband and select the shape keypoints based on the minimum and maximum values. For example, the shape keypoints can be keypoints at or below the minimum values or at or above the maximum values. A method to identify shape keypoints is described in greater detail with respect to FIG. 9. The first shape keypoint identifier 212 can use a method, such as the method described in FIG. 9 to identify each shape keypoint for each part of the segmented user image 210.

The computing system 200 can similarly process a target garment image 214. In some instances, the target garment image 214 is an image that includes the target garment in isolation, and no user is wearing the target garment. In other instances, the target garment image 214 is an image of a reference user, who is not necessarily the target user, wearing the target garment. For example, the target garment image 214 is a stock image of a model wearing the target garment. If the target garment image 214 includes the target garment, and a reference user is wearing the target garment, then the target garment image 214 is transmitted to the second three-dimensional model generator 216. The second three-dimensional model generator 216 can generate a three-dimensional model 218 (e.g., a DensePose-based model, a SMPL model, or other appropriate model) of the reference user wearing the target garment. If, however, the target garment image 214 includes the target garment, and no user is wearing the target garment, then the target garment image 214 is not transmitted to the second three-dimensional generator 216.

The target garment image 214 can be transmitted to the second segmentor 220, which can segment the target garment image 214 to generate the segmented target garment image 222. Similar to the segments described with respect to the first segmentor 208, the second segmentor 220 can segment the target garment image 214 into parts associated with anatomical body parts.

The segmented target garment image 222 can be transmitted to the second shape keypoint identifier 224. If a second three-dimensional 218 model was created, then the second three-dimensional 218 model can also be transmitted to the second shape keypoint identifier 224. The second shape keypoint identifier 224 can identify shape keypoints for each part of the segmented target garment image 222. Similar to the first shape keypoint identifier 212, the second shape keypoint identifier 224 can access a mapping of parts to a set number of shape keypoints. The mapping of the number of shape keypoints to each part can be based on the part. The target garment image 214 can also be received by a second machine learning model 226 described further with respect to FIG. 4. It should be appreciated, in some embodiments, the target garment image 214 is not transmitted to the second shape keypoint identifier 224, and no shape keypoints are identified for the target garment image.

As indicated above, FIG. 3 is a continuation of FIG. 2. FIG. 3 describes certain elements of the computing system that follow the first shape keypoint identifier 212 and the second shape keypoint identifier 224. FIG. 3 is an illustration of an example computing system 200 for generating an augmented image, according to embodiments of the present disclosure. The computing system 200 of FIG. 3 can be the same computing system of FIG. 2. The first shape keypoint identifier 212 can transmit first shape keypoint information 300 and the first segmented three-dimensional model 210 to the first pose estimator 302. The first pose estimator 302 can include a machine learning model trained to identify pose of the user. Each pose keypoint can be arranged at a joint (e.g., neck, left shoulder, left elbow, left wrist, right shoulder, right elbow, right wrist, left hip, right hip, left knee, left ankle, right knee, and right ankle). Based on the spatial locations of the pose keypoints, the first pose estimator 302 can estimate a pose (e.g., front-facing, back-facing, side-facing, or other pose) of the target user in the user image 202. The pose keypoints and the pose of the target user can be included as first pose information 304. In some embodiments, rather than use a pose estimation network, the first pose estimator 302 can infer a pose of the user based on the first three-dimensional model 206. For example, based on a spatial location of various joints of the first three-dimensional model 206, the first pose estimator 302 can infer the pose of the user without the use of a neural network, such as the pose estimation network.

The garment remover 306 can receive the user image 202, the first segmented three-dimensional model 210, the first pose information 304, and target garment information. The garment remover 306 can identify the parts associated with the target garment from the first segmented three-dimensional model 210. For example, if the target garment is a shirt, the garment remover 306 can remove the pixels at the torso, left shoulder, and right shoulder of the user image. The garment remover 306 can use the first pose information to determine that the correct parts are identified. For example, if the pose is a back-facing pose, the garment remover 306 can determine to remove pixels associated with parts for a back of a torso. The garment remover 306 can remove the pixels from the user image 202 to generate the user image with garment removed 308.

If, the target garment image 214 includes an image of a reference user wearing the target garment, the second shape keypoint identifier 224 can transmit the second segmented three-dimensional model 222 and the second shape keypoints information 310 to the second pose estimator 312. The second pose estimator 312 can determine the second pose information of the person similarly to how the first pose estimator 302 determines the first pose information 304. For example, the second pose estimator 312 can either use a pose estimation network or determine the pose based on the second three-dimensional model 218. If, however, if the target garment image 214 includes the target garment and no person is wearing the target garment, then the second pose estimator 312 is not used.

The computing system 200 can store the first shape keypoint information 300, the first pose information 304, the second shape keypoint information 310, and the second pose information 314, if any, as conditional information 316. The conditional information 316 can be considered information that can be received by a machine learning model to influence the model's data generation process. The conditional information can be stored by the computing system 200 and provided to downstream elements of the computing system 200. It should be appreciated that in some instances, a shape keypoint can be in a same spatial location as a pose keypoint. In these instances, the one of the shape keypoint or the pose keypoint can be removed from the conditional information 316. In some instances, the computing system 200 can use the spatial locations of the pose keypoints and the shape keypoints to determine additional information. For example, the computing system can calculate user dimensions (e.g., body mass index (BMI), a waist size to height ratio, a hip size to height ratio, a bust size to height ratio, a height, or other user dimensions).

As indicated above, FIG. 4 is a continuation of FIG. 3. Collectively, FIGS. 2-4 describe an example computing system for generating an augmented image. FIG. 4 is an illustration of an example computing system 200 for generating an augmented image, according to embodiments of the present disclosure. The computing system 200 of FIG. 4 can be the same computing system 200 of FIG. 2 and the computing system 200 of FIG. 3. As illustrated, the user image with garment removed 308, the user image 202, and the conditional information 316 can be used as inputs for downstream components of the computing system 200.

The user image with garment removed 308 and the conditional information 316 can be used as an input for a first machine learning model 400, which can be a diffusion model. It should be appreciated by one of various skill in the art that various machine learning models, such as diffusion models, transformer networks, can be used to generate the augmented image 406. The following description can include one technique for generating the augmented image 406. The first machine learning model 400 can be trained to use the user image with garment removed 308, target garment features received from the second machine learning model and the conditional information to generate the augmented image. The conditional information 316 can include the first pose information 304, the second pose information 314, if any, the first shape keypoint information 300, the second shape keypoint information. The conditional information can be used to implicitly guide the first machine learning model 400 to generate the augmented image 406. The first machine learning model 400 can include a first encoder unit 402 that can map the user image with garment removed 308 to embeddings in latent space. The first machine learning model 400 can further include a decoder unit 404 for assisting with generating the augmented image 406. In particular, the first encoder unit 402 can be trained to map pixels from the user image with garment removed 308 to embeddings. The first encoder unit 402 can generate vectors that are considered query vectors, and the decoder unit 404 can generate corresponding vectors known as key vectors from the embeddings. The query vectors and the key vectors can be passed to a cross-attention layer at the decoder unit 404. The cross attention layer can perform a mathematical operation on the corresponding key vectors and query vectors to generate value vectors. The value vectors can be associated with scores that indicate the importance of a pixel in relation to other pixels. For example, the value vectors can indicate that the pixels associated with shape keypoints are of greater importance in relation to pixels that are not associated with shape keypoints. As described below, the value vectors can be used to generate probability distributions for determining the data to add to the user image with garment removed 308.

Similarly, the second machine learning model 226 can map the target garment image 214 to embeddings. The second encoder unit 408 can generate query vectors based on the embeddings and the decoder unit 404 can generate corresponding key vectors. The decoder unit 404 can perform a series of operations on the user image with garment removed 308 based information extracted from the user image with garment removed 308 and target garment features provided by the second machine learning model 226. In some instances, this can be referred to denoising the image. For example, based on features of the target garment, the decoder unit 404 can estimate a data distribution that depicts the user wearing the target garment. The decoder unit 404 can extract features from user wearing the target garment and generate a probability distribution for the data to be added to the user image with garment removed 308. The probability distribution can be based on the above-described value vectors. The decoder unit 404 can select data based on the probability distribution and add data to the user image with garment removed 308 (e.g., the area in the garment was removed from the user image 202). After the decoder unit 404 has added the data, the decoder unit 404 can perform a subsequent estimation of a data distribution that depicts the target user wearing the target garment. As the decoder unit 404 is beginning with a user image with garment removed 308 with at least some data added, the subsequent estimation can be more accurate. The decoder unit 404 can continue to perform these operations until an augmented image 406 with a realistic depiction of the target user wearing the target garment is generated.

Figure 5:
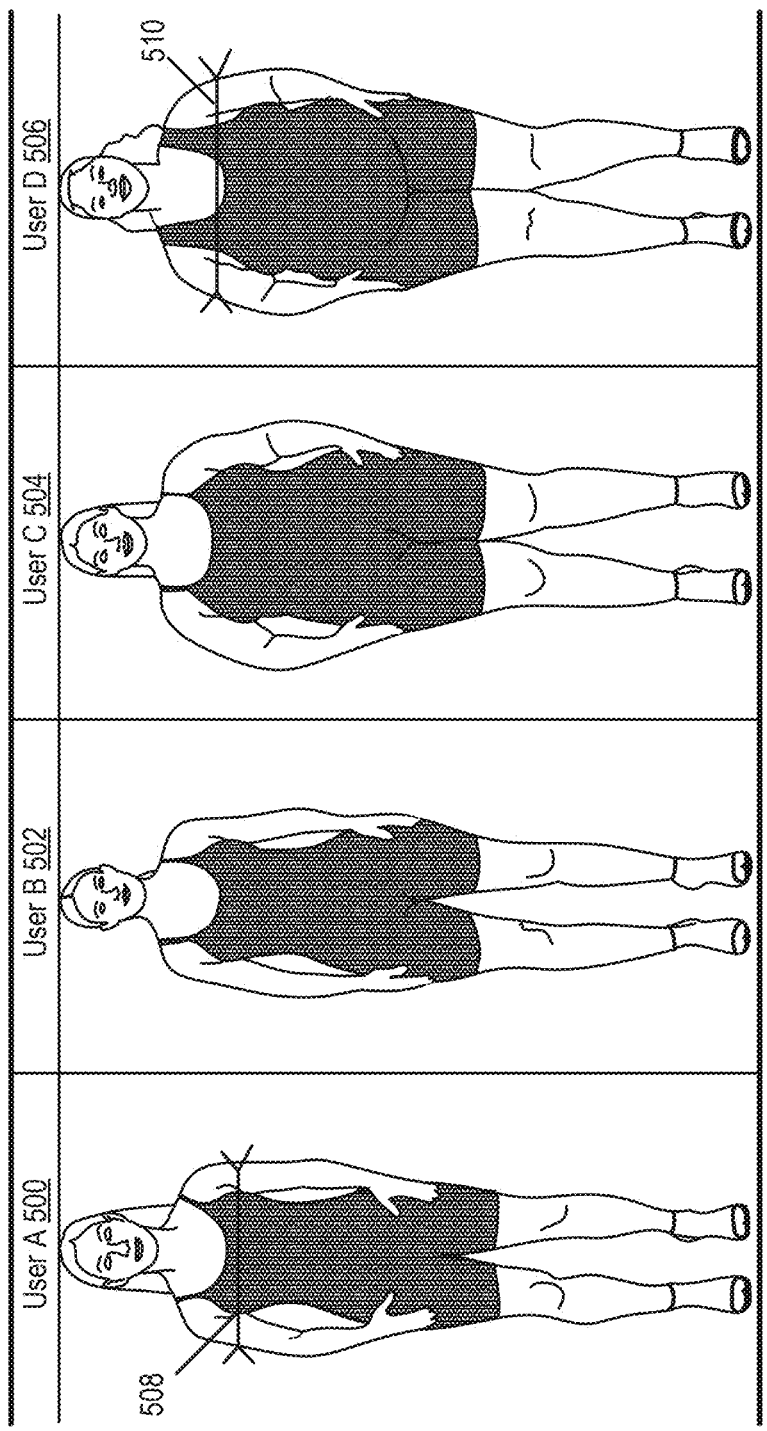
FIG. 5 is an illustration of example images of users, according to embodiments of the present disclosure.
Figure 6:
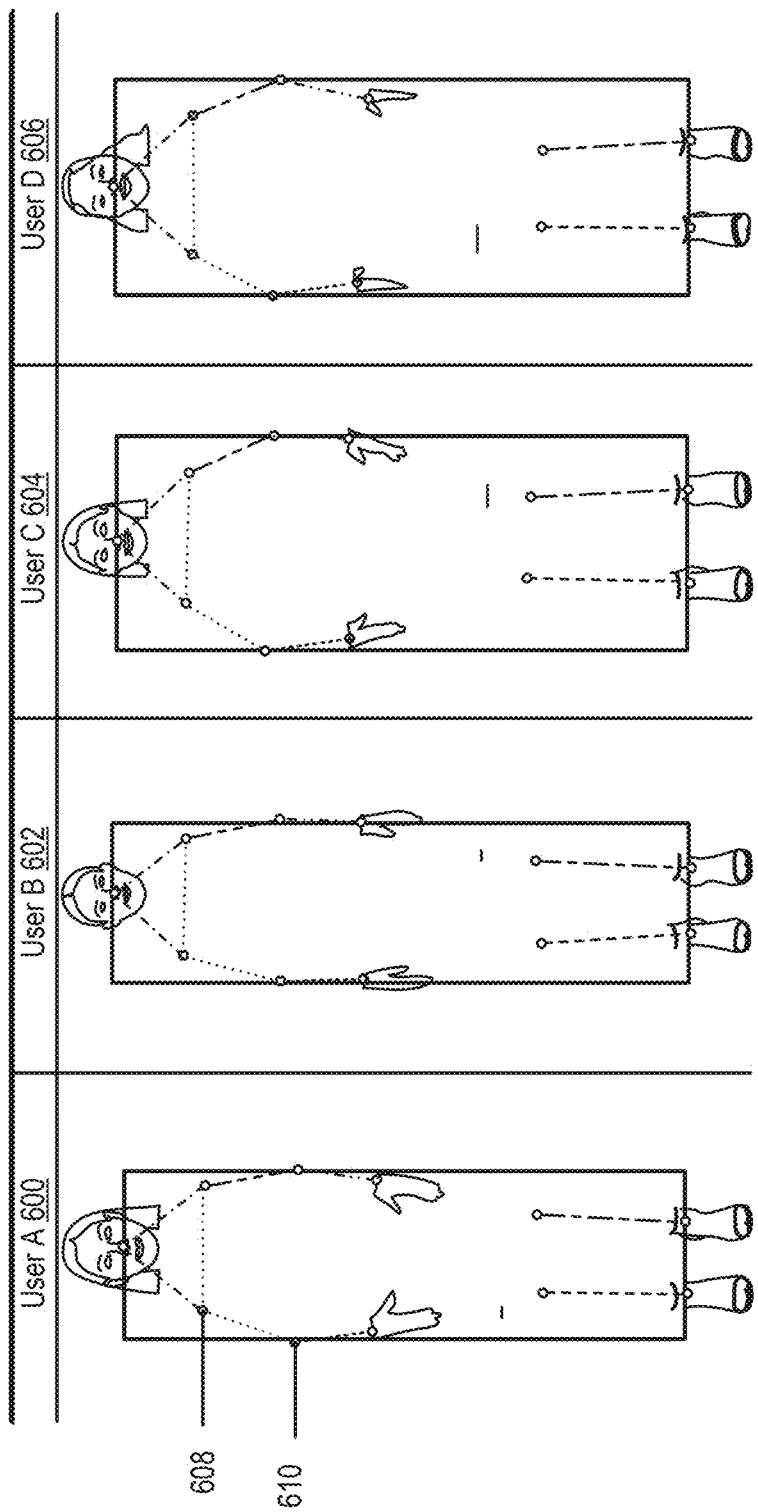
FIG. 6 is an illustration of example user pose estimations, according to embodiments of the present disclosure.
Figure 7:
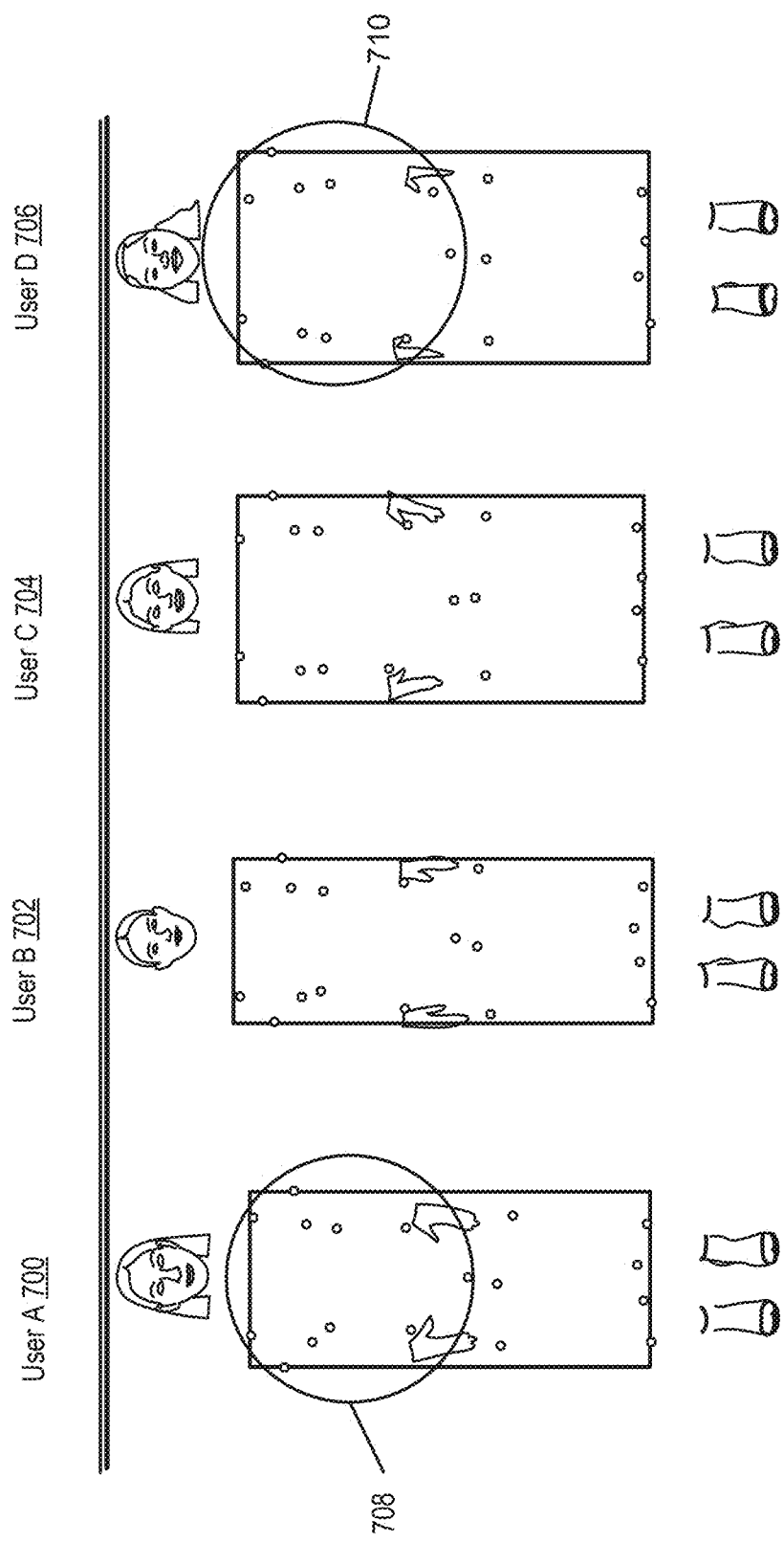
FIG. 7 is an illustration of user keypoints, according to embodiments of the present disclosure.

FIGS. 5-7 are illustrative of user images, user pose estimations, and user keypoint identifications. FIG. 5 is an illustration of example images of users, according to embodiments of the present disclosure. As illustrated, there are images of four users: user A 500, user B 502, user C 504, and user D 506. Each of the users can be associated with a different size (e.g., size 1, size 2, size 3, and size 4), which may correspond to and/or be categorized into standard sizes. FIG. 5. illustrates the variations in body types for users. A computing system (e.g., computing system 200) can receive an image of user (e.g., user A 500, user B 502, user C 504, and user D 506) and use the pose keypoints and the shape keypoints to determine the spatial dimensions of user. For example, each of the users is in a front-facing pose with their arms at their sides. It can be expected that a pose estimator (e.g., the first pose estimator 302) can identify pose keypoints that indicate the front-facing pose for each user. The pose keypoints are described with more particularity with respect to FIG. 6. Given that the garment size of the target users progressively increases from user A 500 to user D 506, it can be expected that the bodily dimensions of the targets themselves would be different. A shape keypoint identifier (e.g., the first shape keypoint identifier 212) can identify shape keypoints that are indicative of the bodily dimensions. For example, as a comparison, user A 500 can be expected to have a first distance 508 between her arms that is shorter than a second distance 510 between the arms of user D's arms. These distances can be derived through identification of the shape keypoints. The shape keypoints are described with more particularity in respect to FIG. 7.

FIG. 6 is an illustration of example user pose estimations, according to embodiments of the present disclosure. As illustrated, there are respective pose keypoints for each user of the four users, user A 600 (e.g., user A 500), user B 602 (e.g., user B 502), user C 604 (e.g., user C 504), and user D 606 (e.g., user D 506). Each of the pose estimations can be generated by a pose estimator (e.g., first pose estimator 302) and included as pose information (e.g., first pose information 304). As illustrated, in each pose estimation can identify various pose keypoints as joints of a user. For example, for user A 600, the pose estimator can identify a first pose keypoint 608 (e.g., a shoulder) and a second pose keypoint 610 (e.g., elbow).

FIG. 7 is an illustration of user shape keypoints, according to embodiments of the present disclosure. As illustrated, there are shape keypoints of the four users: user A 700 (e.g., user A 500), user B 702 (e.g., user B 502), user C 704 (e.g., user C 504), and user D 706 (e.g., user D 506). A shape keypoint identifier (e.g., first shape keypoint identifier 212) can identify shape keypoints for each user. The number and locations of the shape keypoints can be based on the parts. For example, each part can be associated with a predetermined number of shape keypoints. For example, a part associated with the front of the torso can be associated with nine keypoints. The shape keypoint identifier can identify a first set of shape keypoints 708 (e.g., shape keypoints enclosed by the large circle) associated with a part that describes a torso of a user A 700. As illustrated, there are nine shape keypoints associated with the torso (e.g., nine smaller circles in the large circle). The shape keypoint identifier can also identify a second set of shape keypoints 710 (e.g., keypoints enclosed by the large circle) associated with a part that describes a torso of a user D 706.

As shown in FIG. 5, user A 700 can have an smaller size and user D 706 can have a larger size. Therefore, it can be expected that second set of shape keypoints 710 will be spread out greater across user D's torso, than the first set of shape keypoints 708 are spread out across user A's torso. This is reflected in spatial distributions of the user A shape keypoints 708 and the spatial distributions of the user D shape keypoints 710. It can be seen in FIG. 7, that the user D's second set of shape keypoints 710 are spatially arranged further apart than the user A's first set of shape keypoints 708. Therefore, as indicated above, the user A keypoints 708 can provide shape and pose information for user A 700 and the user D shape keypoints 710 can provide shape and pose information for user D 706. The shape keypoints can be used to define a distribution of mass across a user's body. For example, the shape keypoints can assist in providing a muscularity or a mass distribution of a user. For example, the shape keypoints can be used to define the muscularity of a user's body.

Figure 8:
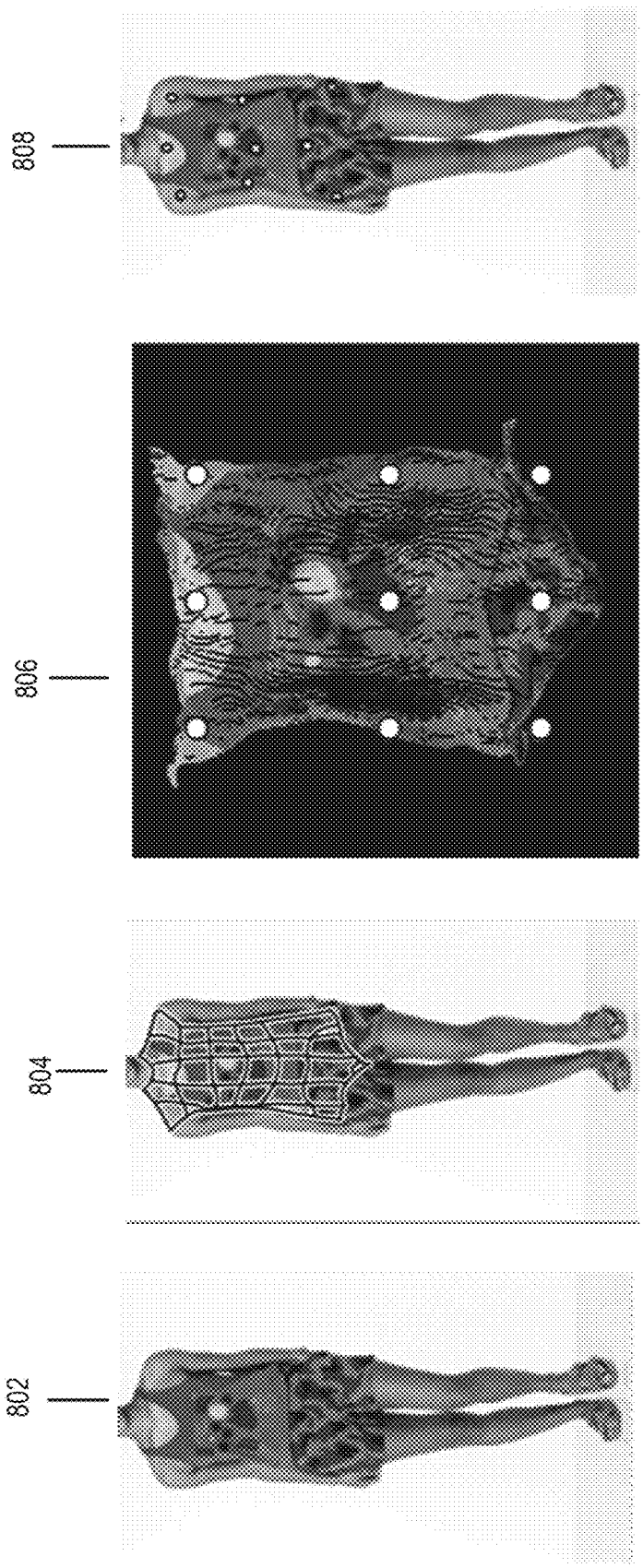
FIG. 8 is an illustration of an example keypoint identification, according to embodiments of the present disclosure.

FIG. 8 is an illustration of an example keypoint identification, according to embodiments of the present disclosure. An image 802 of a user wearing garments is shown. The image 802 can be a real-world image captured by an image-capturing device (e.g., image capturing device 116). A computing system (e.g., the computing system 200) can identify isobands across the user as seen in 804. The computing system can determine a mesh network and the isobands can be contours of cells of the mesh network overlaid on the user. An isoband can be defined with respect to a u-coordinate shown super-imposed on the images 806 and 808. The computing system can further select a minimum value and a maximum value for the isoband. The computing system can further identify the keypoints based on the minimum value and the maximum value. For example, a keypoint can be identified as a keypoint have a u-coordinate value greater than the maximum value or less than the minimum value. As illustrated, the computing system can identify nine keypoints. A keypoint image 808 of the user with the keypoints overlaid on the user's body is provided for illustration.

Figure 9:
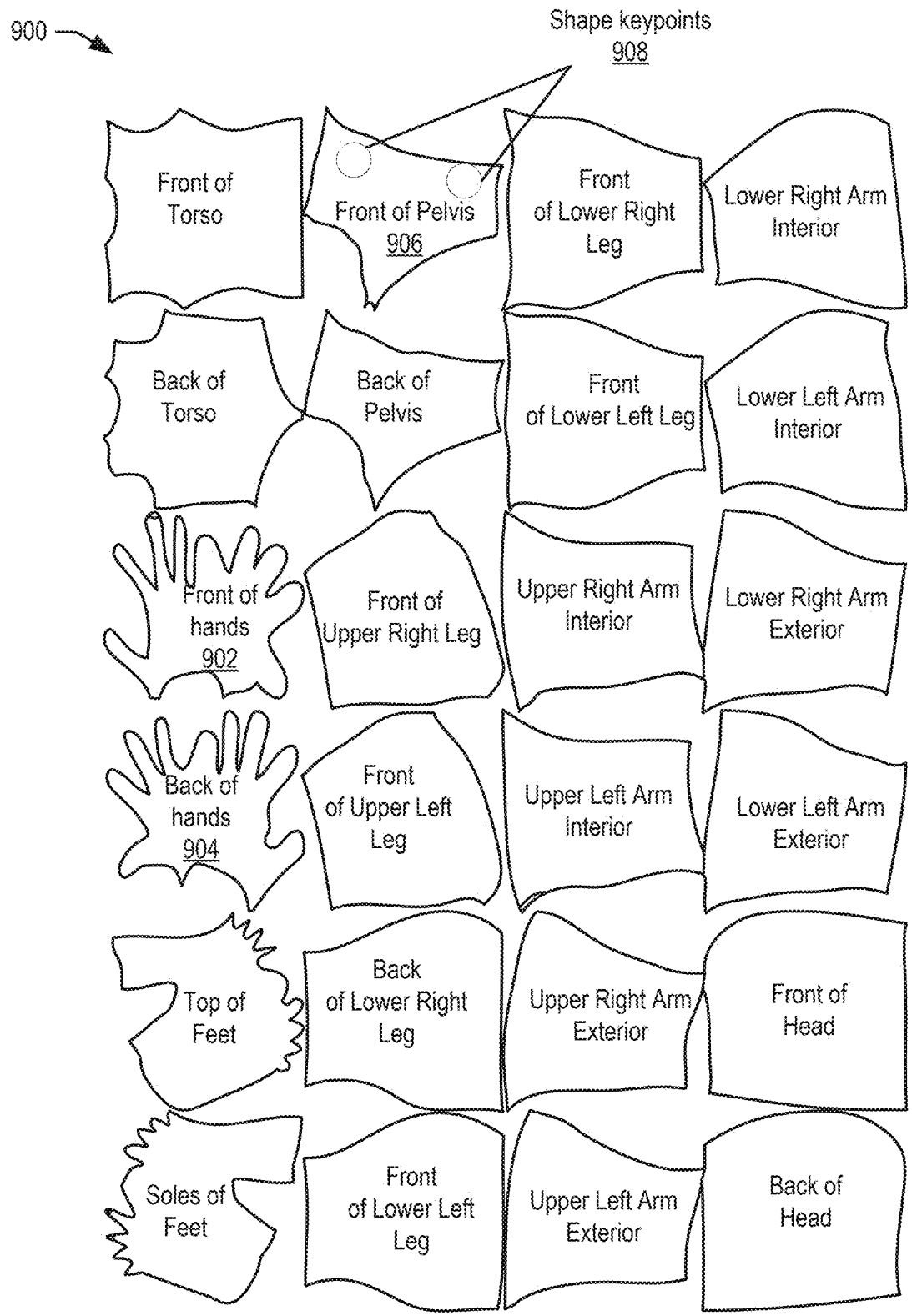
FIG. 9 is an illustration of example segmentation parts, according to embodiments of the present disclosure.

FIG. 9 is an illustration of example segmentation parts 900, according to embodiments of the present disclosure. As indicated above, the three-dimensional model of either the user or the target garment can be segmented into parts that are associated with anatomical body parts. As further indicated above the parts can include twenty-four parts that are each associated with an anatomical body part. The part can be identified by a segmentor (e.g., first segmentor 208). Each of the parts can be associated with a respective i-coordinate that identifies the part. Each of the parts can further be associated with a set number of keypoints to be identified. For illustration purposes, the parts can include a front of hands 902 and a back of hands 904. Each of the front of hands 902 and the back of hands 904 can be associated with a respective i-coordinate. Whether a computing system (e.g., computing system 200) segments the three-dimensional model of the user to include the front of hands 902 and the back of hands 904 can depend on the user's pose. For example, if the user image (e.g., user image 202) includes the front of the user's hands, the computing system can use the front of hands 902. If, however, the user image includes the back of the user's hands part, the computing system can use the back of hands 804. Each part can be associated with a set number of shape keypoints. For a front of pelvis 906, the set number of shape keypoints can be two shape keypoints 908. Furthermore, the front of hands 902 can be associated with one shape keypoint. The number of set shape keypoints can be determined based various parameters. For example, the number of shape keypoints can be based on empirical testing of generating an image of the target garment onto the user image with garment removed.

Some or all of the process flow 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
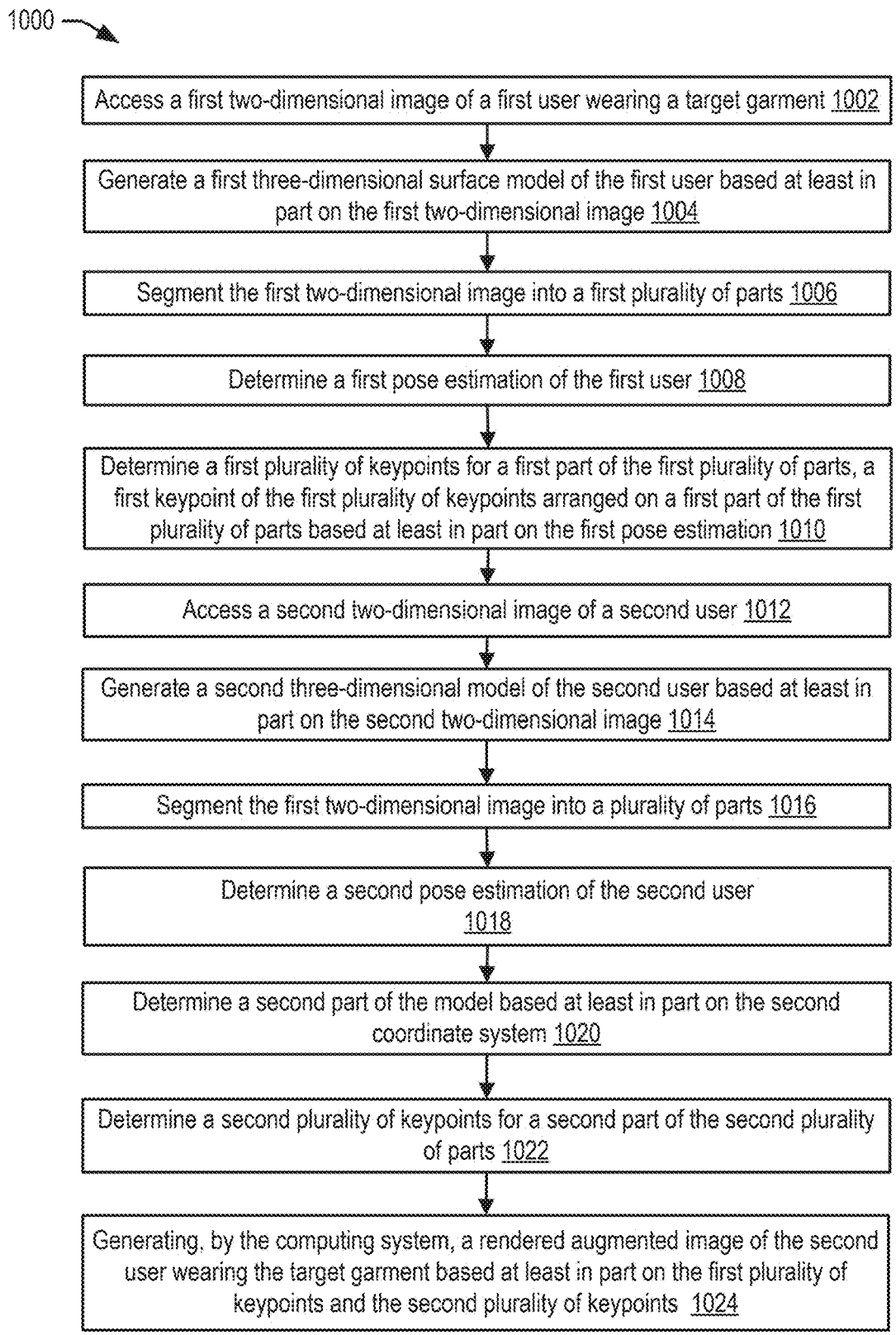
FIG. 10 is an example process flow for generating an augmented image, according to embodiments of the present disclosure.

FIG. 10 is an example process flow 1000 for generating an augmented image, according to embodiments of the present disclosure. At 1002, the method can include a computing system (e.g., the computing system 200) accessing a first two-dimensional image (e.g., target garment image 214) of a first user wearing a target garment. The first two-dimensional image can include a first pixel having a first x-coordinate and a first y-coordinate. For example, a user (e.g., target user 102) can use their user device (e.g., user device 104) to access a computing system (e.g., computing system 106) that can implement a virtual try-on system. The user can enter various filters for garments, and the computing system can return a list of garment images (e.g., list of garment images 112). The user can select a target garment (e.g., target garment 120) from the list of garment images. The computing system can use the target garment images from the list of garment images. The image of the target garment can include the first user, such as a fashion model, wearing the target garment.

At 1004, the method can include the computing system generating a first three-dimensional model (e.g., second three-dimensional model 218) of the first user that is wearing the target garment based at least in part on the first two-dimensional image. For example, the computing system can use a three-dimensional model generator (e.g., the second three-dimensional model generator 216) to generate the model. At 1006, the method can include the computing system segmenting the first two-dimensional model into a first plurality of parts. For example, the computing system can use a segmentor (e.g., the second segmentor 220) to segment the two-dimensional image into parts. The parts can be associated with anatomical body parts as described in FIG. 9.

At 1008, the method can include the computing system determining a first pose estimation of the first user. For example, the computing system can use a pose estimator (e.g., second pose estimator 312) to estimate the pose. The pose estimator can include a neural network (e.g., a CNN, RNN, a stacked hourglass network, or other appropriate network) to estimate the pose. In other instances, the pose estimator can estimate the pose of the first user using the three-dimensional model.

At 1010, the method can include the computing system determining a first plurality of shape keypoints for a first part of the first plurality of parts. For example, the computing system can use a shape keypoint identifier (e.g., the second shape keypoint identifier 224) A first shape keypoint of the first plurality of shape keypoints can be arranged on a first part of the first plurality of parts based at least in part on the first pose estimation. The first shape keypoint can be represented by a first plurality of shape keypoint coordinates (e.g., i-, u-, and v-coordinates) and correspond to the first pixel.

At 1012, the method can include the computing system accessing a second two-dimensional image of a second user (e.g., the user image 202). For example, The user can provide a user image of the user (e.g., a selfie or other image of the user's body) to the computing system via the user device. The second two-dimensional image can include a second pixel having a second x-coordinate and a second y-coordinate.

At 1014, the method can include the computing system generating a second three-dimensional model (e.g., the first three-dimensional model 206) of the user based at least in part on the second two-dimensional image. For example, the computing system can use a three-dimensional model generator (e.g., the first three-dimensional model generator 204). The second three-dimensional model can be segmented into a second plurality of parts. For example, the computing system can use a segmentor (e.g., the first segmentor 208) to segment the three-dimensional model into parts. The parts can be associated with anatomical body parts as described in FIG. 8.

At 1016, the method can include the computing system segmenting the second two-dimensional image into a second plurality of parts. For example, the computing system can use a segmentor (e.g., the first segmentor 208) to segment the second two-dimensional image into parts. The parts can be associated with anatomical body parts as described in FIG. 9.

At 1018, the method can include the computing system determining a second pose estimation of the second user. For example, the computing system can use a pose estimator (e.g., first pose estimator 302) to estimate the pose. The pose estimator can include neural network (e.g., a CNN, RNN, a stacked hourglass network, or other appropriate network) to estimate the pose. In other instances, the pose estimator can estimate the pose of the first user using the three-dimensional model.

At 1020, the method can include the computing system determining a second part of the model based at least in part on the second coordinate system. The second part can correspond to the first part. For example, the computing system can use the segmentor to identify the part. Furthermore, the second part can correspond to the same anatomical part as the first part. For example, if the first part corresponds to a back of torso, the second part can also correspond to a back torso.

At 1022, the method can include the computing system determining a second plurality of keypoints for a second part of the second plurality of parts. A second keypoint of the second plurality of keypoints can be arranged on a second part of the second plurality of parts based at least in part on the second coordinate system. The second keypoint represented by a second plurality of keypoint coordinates. The second plurality of keypoint coordinates can provide a first physical characteristic (e.g., shape and pose information) of the user. In some instances, the method can further include the computing system removing a garment worn by the second user from the second two-dimensional image.

At 1024, the method can include the computing system generating a rendered augmented image (e.g., augmented image 406) of the second user target wearing the target garment based at least in part on adjusting a first spatial location of a first keypoint of the first plurality of keypoints to correspond to a second spatial location of a second keypoint of the second plurality of keypoint coordinates. The computing system can cause the rendered augmented image to be displayed on a display (e.g., user device display 110) of a computing device, wherein the second two-dimensional image is received via the computing device.

For example, the computing system can use a first machine learning model (e.g., first machine learning model 400). The first machine learning model can be trained to project pixels onto the second two-dimensional image. For example, the first machine learning model can receive garment features extracted from the first two-dimensional image. In some instances, the garment features are received from a second machine learning model. The first machine learning model can further receive conditional information, such as shape keypoints. The first machine learning model can use the garment features and the conditional information to fill in or inpaint pixels onto the second two-dimensional image. For example, the first machine learning model can be a diffusion model that iteratively adds pixels to the second two-dimensional image until the image realistically resembles the second user wearing the target garment.

Figure 11:
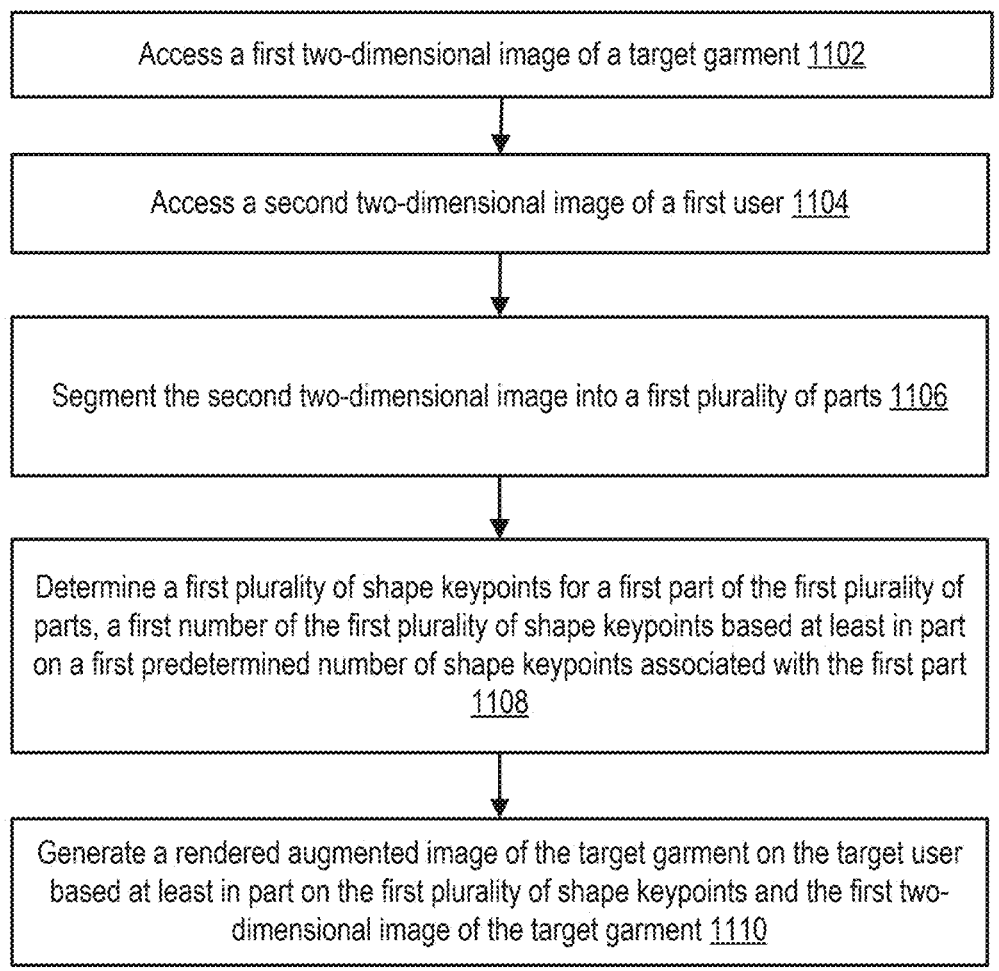
FIG. 11 is an example process flow for generating an augmented image, according to embodiments of the present disclosure.

FIG. 11 is an example process flow 1100 for generating an augmented image, according to embodiments of the present disclosure. At 1102, the method can include the computing system (e.g., computing system 200) access a first two-dimensional image of a target garment (e.g., target garment image 214). For example, a user (e.g., target user 102) can use their user device (e.g., user device 104) to access a computing system (e.g., computing system 106) that can implement a virtual try-on system. The user can enter various filters for garments, and the computing system can return a list of garment images (e.g., list of garment images 112). The user can select a target garment (e.g., target garment 120) from the list of garment images. The computing system can use the target garment images from the list of garment images.

At 1104, the method can include the computing system accessing a first two-dimensional image of a first user. the image of the first user can be an image of a user that is accessing the computing system. (e.g., a selfie or other image of the user's body) to the computing system via the user device. The image of the first user can also be an image of a reference user. For example, the user accessing the computing system can select an image of a reference user based on the physical characters of the reference user.

At 1106, the method can include the computing system segmenting the second two-dimensional image into a first plurality of parts. For example, the computing system can use a segmentor to segment the second two-dimensional image into parts. The parts can be associated with anatomical body parts as described in FIG. 9.

At 1108, the method can include the computing system determining a first plurality of shape keypoints for a first part of the first plurality of parts. A first number of the second plurality of shape keypoints can be based at least in part on a first predetermined number of shape keypoints associated with the first part.

Each shape keypoint can include a first intensity (i) coordinate corresponding to the first part, a first u-coordinate corresponding to a first x-coordinate of the nearest pixel of the first plurality of pixels, and a first v-coordinate corresponding to a first y-coordinate of the nearest pixel of the first plurality of pixels. The first shape keypoint can provide physical characteristic information of the target garment based on the spacing of the first shape keypoint in relation to other shape keypoints.

Alternatively, in the case that the first shape keypoint is occluded, the first shape keypoint can include a first intensity (i) coordinate corresponding to the first part, a first u-coordinate corresponding to the first average x-coordinate, and a first v-coordinate corresponding to the first average y-coordinate.

To determine a shape keypoint, the computing system can access a first two-dimensional image of the target garment, the first two-dimensional image comprising a first plurality of pixels. For example, the computing system can use a shape keypoint identifier (e.g., the second shape keypoint identifier 224) to identify the keypoints. The computing system can determine a first shape keypoint of the first part. The computing system can determine a set of n-nearest pixels of the first plurality of pixels that are nearest to the first shape keypoint. Each pixel of the set of n-nearest pixels can include a respective x-coordinate. Each pixel of the set of n-nearest pixels can include a respective y-coordinate. The computing system can determine a first average x-coordinate based at least in part on each pixel of the set of n-nearest pixels. The computing system can determine a first average y-coordinate based at least in part on each pixel of the set of n-nearest pixels. The computing system can determine, for the first shape keypoint a first intensity (i) coordinate corresponding to the first part, a first u-coordinate corresponding to the first average x-coordinate, and a first v-coordinate corresponding to the first average y-coordinate, and the first shape keypoint providing physical characteristic information of the target garment.

At 1110, the method can include the computing system generating a rendered augmented image (e.g., augmented image 406) of the target garment on the user based at least in part on the first plurality of shape keypoints and the first two-dimensional image.

For example, the computing system can use a first machine learning model (e.g., first machine learning model 400). The first machine learning model can be trained to project pixels onto the second two-dimensional image. For example, the first machine learning model can receive garment features extracted from the first two-dimensional image. In some instances, the garment features are received from a second machine learning model. The first machine learning model can further receive conditional information, such as shape keypoints. The first machine learning model can use the garment features and the conditional information to fill in or inpaint pixels onto the second two-dimensional image. For example, the first machine learning model can be a diffusion model that iteratively adds pixels to the second two-dimensional image until the image realistically resembles the second user wearing the target garment.

FIG. 12 is an example process flow 1200 for training a machine learning model (e.g., one or more diffusion models) to generate an augmented image, according to embodiments of the present disclosure. At 1202, the method can include the computing system receiving, at a first machine learning model, a query vector generated based at least in part on a first shape keypoint of a first plurality of shape keypoints associated with a first user image.

The first machine learning model can have previously trained on a forward diffusion process, in which the noise is gradually added to an image until the image is completely noise. For example, the computing system can receive images of clothing and gradually add noise to the images. The first machine learning model can then be trained on a reverse diffusion process, in which the first machine learning model receives a noisy image and uses a cross attention mechanism to iteratively adding data to the noisy image to create an image of the user wearing a garment.

At 1204, the method can include the computing system receiving, at a second machine learning model, receiving, at the machine learning model of the computing system, a key vector generated based at least in part on the first shape keypoint. The cross attention mechanism can use the query vector and the key vector to determine the data to add to the image of the first user.

At 1206, the method can include the computing system by the first machine learning model of the computing system, a pixel associated with the first keypoint on an image of first user using a cross-attention mechanism based at least in part on the query vector and the key vector. The cross attention mechanism can be used to generate a value vector from the query vector and the key vector. The value vector can be used to guide the data generation process and determine which pixels are to be arranged where on the image of the first user. At 1208, the method can include the computing system comparing the an arrangement of the pixel to a ground truth arrangement of the pixel using a loss function. The loss function can be used to evaluate a difference between the ground truth and the arrangement. The loss function can assist in determining the accuracy of the generative models.

At 1210, the method can include the computing system adjusting a first weight of the first machine learning model based at least in part on the loss function. For example, based on the loss function, the computing system can use backpropagation to adjust the weights of the first machine learning model and the second machine learning model. By adjusting the weight, the computing system can improve the accuracy of the first machine learning model.

In some instances, a second machine learning model can be connected to the first machine learning model during the training phase. The second machine learning model can be trained in parallel to the first learning model. For example, the second machine learning model can be trained to extract a feature from a target garment image. The first machine learning model can be trained to determine a characteristic (e.g., color, location) of a pixel to be added to the first user image based on the target garment feature.

In some instances, it may be necessary to add skin pigment to the augmented image. Therefore, the computing system can receive, at the second generative machine learning model, a third embedding (a second query vector) generated from a second keypoint of the second three-dimensional model of a user. The computing system can determine, by the second generative machine learning model, that the third embedding is associated with a removed garment. The computing system can further adjust, by the second generative machine learning model, a weight of the second generative machine learning model to generate a pixel (e.g., a skin colored pixel) to fill in a datapoint associated with the third embedding.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Figure 13:
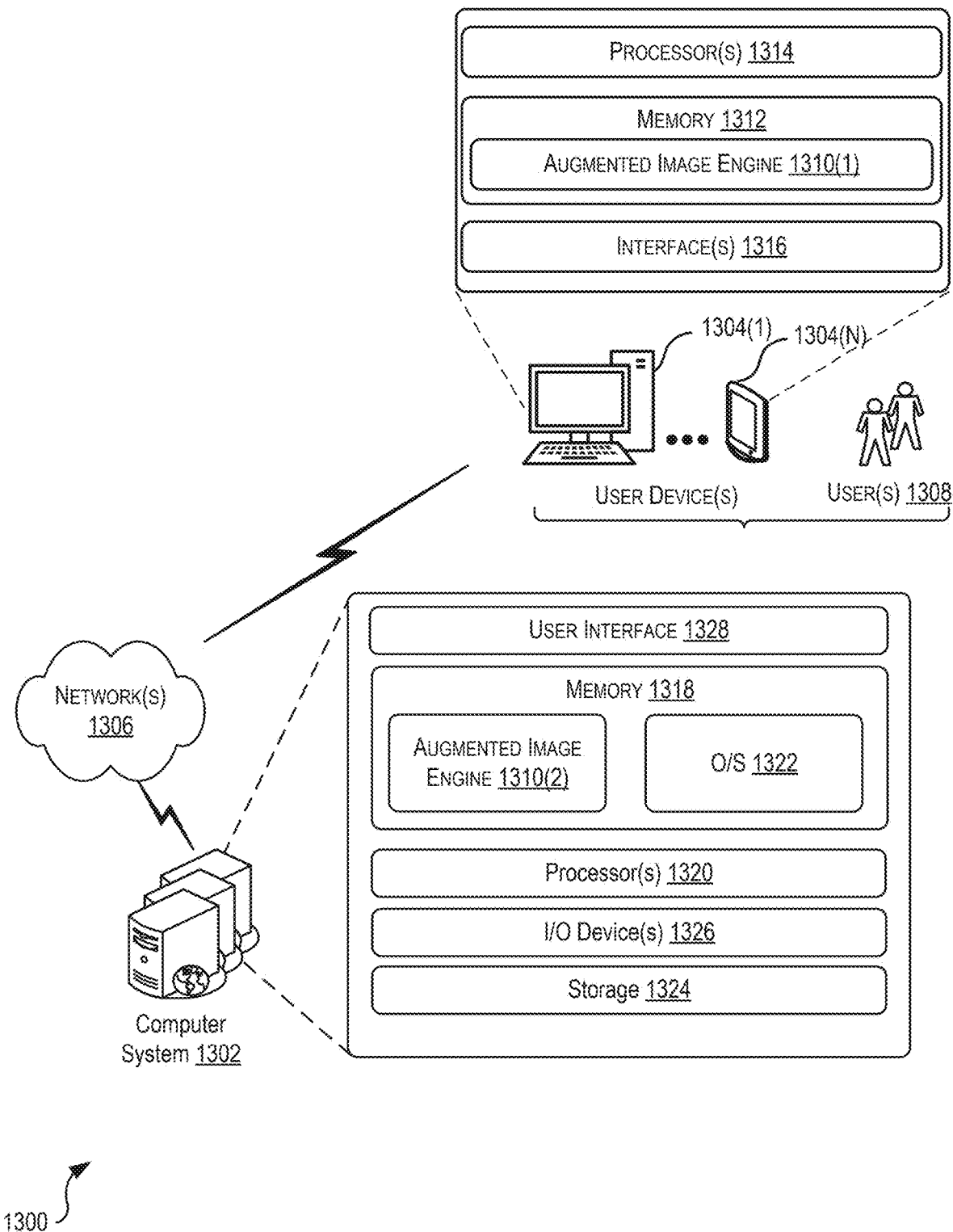
FIG. 13 illustrates an environment in which various embodiments can be implemented.

FIG. 13 illustrates an example schematic architecture 1300 for implementing techniques related to generating an augmented image, according to embodiments of the present disclosure. The architecture 1300 may include a computer system 1302 (e.g., the computer system 200 described herein) in communication with one or more user devices 1304(1)-1304(N) via one or more networks 1306 (hereinafter, "network 108"). The one or more user devices can include, for example, the user device 104 of FIG. 1.

The user device 1304 may be operable by one or more users 1308 to interact with the computer system 1302. The user device 1304 may be any suitable type of computing device such as, but not limited to, a tablet, a mobile phone, a smart phone, a network-enabled streaming device (a high-definition multimedia interface ("HDMI") micro-console pluggable device), a personal digital assistant ("PDA"), an onboard computer, a tablet computer, etc. For example, the user device 1304(1) is illustrated as a desktop computer, while the user device 1304(N) is illustrated as an example of a handheld mobile device.

The user device 1304 may include a memory 1312 and processor(s) 1314. In the memory 1312 may be stored program instructions that are loadable and executable on the processor(s) 1314, as well as data generated during the execution of these programs. Depending on the configuration and type of user device 1304, the memory 1312 may be volatile (such as random access memory ("RAM")) and/or non-volatile (such as read-only memory (ROM), flash memory, etc.).

In some examples, the memory 1312 image data (e.g., captured by the image capturing device 116 of FIG. 1). The user device 1304 may also include one or more interfaces 1316 to enable communication with other devices, systems, and the like. The augmented image engine 1310(1) may generate an augmented image (e.g., augmented image 406). The augmented image engine 1310, whether embodied in the user device 1304 or the computer system 1302, may be configured to perform the techniques described herein. In an example, the augmented image engine 1310(1) can include any other suitable devices, engines, modules, models, and the like.

Turning now to the details of the computer system 1302, the computer system 1302 may include one or more computer system computers, perhaps arranged in a cluster of servers or as a server farm, and may host web service applications. The function of the computer system 1302 may be implemented a cloud-based environment such that individual components of the computer system 1302 are virtual resources in a distributed environment.

The computer system 1302 may include at least one memory 1318 and one or more processing units (or processor(s)) 1320. The processor 1320 may be implemented as appropriate in hardware, computer-executable instructions, software, firmware, or combinations thereof. Computer-executable instruction, software, or firmware implementations of the processor 1320 may include computer-executable or machine-executable instructions written in any suitable programming language to perform the various functions described. The memory 1318 may include more than one memory and may be distributed throughout the computer system 1302. The memory 1318 may store program instructions that are loadable and executable on the processor(s) 1320, as well as data generated during the execution of these programs. Depending on the configuration and type of memory including the computer system 1302, the memory 1318 may be volatile (such as RAM and/or non-volatile (such as read-only memory ("ROM"), flash memory, or other memory)). The memory 1318 may include an operating system 1322 and one or more application programs, modules, or services for implementing the features disclosed herein including at least a version of the augmented image engine 1310 (e.g., 1310(2)). For example, the augmented image engine 1310 may perform the functionality described herein. In an example, the augmented image engine 1310 can include any other suitable devices, engines, modules, models, and the like.

The computer system 1302 may also include additional storage 1324, which may be removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. The additional storage 1324, both removable and non-removable, is an example of computer-readable storage media. For example, computer-readable storage media may include volatile or non-volatile, removable, or non-removable media implemented in any suitable method or technology for storage of information such as computer-readable instructions, data structures, program modules, or other data. As used herein, modules, engines, applications, and components may refer to programming modules executed by computing systems (e.g., processors) that are part of the computer system 1302 and/or part of the computer system 1302.

The computer system 1302 may also include input/output (I/O) device(s) and/or ports 1326, such as for enabling connection with a keyboard, a mouse, a pen, a voice input device, a touch input device, a display, speakers, a printer, or other I/O device.

In some examples, the computer system 1302 may also include one or more user interface(s) 1328. The user interface 1328 may be utilized by an operator, curator, or other authorized user to access portions of the computer system 1302. In some examples, the user interface 1328 may include a graphical user interface, voice interfaces, web-based applications, programmatic interfaces such as APIs, or other user interface configurations.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    accessing, by a computing system, a first two-dimensional image of a first user wearing a target garment, the first two-dimensional image comprising a first pixel having a first x-coordinate and a first y-coordinate;
    generating, by the computing system, a first three-dimensional model of the first user based at least in part on the first two-dimensional image;
    segmenting, by the computing system, the first two-dimensional image into a first plurality of parts;
    determining, by the computing system, a first pose estimation of the first user;
    determining, by the computing system, a first plurality of shape keypoints for a first part of the first plurality of parts, a first shape keypoint of the first plurality of shape keypoints arranged on the first part of the first plurality of parts based at least in part on the first pose estimation, the first shape keypoint represented by a first plurality of shape keypoint coordinates and corresponding to the first pixel;
    accessing, by the computing system, a second two-dimensional image of a second user, the second two-dimensional image comprising a second pixel having a second x-coordinate and a second y-coordinate;
    generating, by the computing system, a second three-dimensional model of the second user based at least in part on the second two-dimensional image;
    segmenting, by the computing system, the second two-dimensional image into a second plurality of parts;
    determining, by the computing system, a second pose estimation of the second user;
    determining, by the computing system, a second part of the second plurality of parts based at least in part on the second pose estimation, the second part corresponding to the first part;
    determining, by the computing system, a second plurality of shape keypoints for a second part of the second plurality of parts, a second shape keypoint of the second plurality of shape keypoints arranged on the second part of the second plurality of parts based at least in part on the second pose estimation, the second shape keypoint represented by a second plurality of shape keypoint coordinates, the second plurality of shape keypoint coordinates providing first physical characteristic of the target user; and
    generating, by the computing system, a rendered augmented image of the second user wearing the target garment the first plurality of shape keypoints and the second plurality of shape keypoint coordinates.

2. The computer-implemented method of claim 1, wherein the method further comprises:
    receiving a user-based input as to a second physical characteristic of the second user; and generating the rendered augmented image based at least in part on the second physical characteristic of the second user.

3. The computer-implemented method of claim 1, wherein the method further comprises:
causing the rendered augmented image to be displayed on a display of a computing device, wherein the second two-dimensional image is received via the computing device.

4. A computing system, comprising:
one or more processors; and
one or more non-transitory computer-readable media comprising computer-executable instructions that, when executed by the one or more processors, cause the computing system to at least:
 access a first two-dimensional image of a target garment;
 access a second two-dimensional image of a first user;
 segment the second two-dimensional image into a first plurality of parts;
 determine a first plurality of shape keypoints for a first part of the first plurality of parts, a first number of the first plurality of shape keypoints based at least in part on a first predetermined number of shape keypoints associated with the first part; and
 generate a rendered augmented image of the first user wearing the target garment based at least in part on the first plurality of shape keypoints and the first two-dimensional image of the target garment.

5. The computing system of claim 4, wherein the one or more non-transitory computer-readable media comprising computer-executable instructions that, when executed by the one or more processors, further cause the computing system to at least:
 segment the first two-dimensional image into a second plurality of parts;
 determine a second plurality of shape keypoints for a second part of the second plurality of parts, a second number of the second plurality of shape keypoints based a least in part on a predetermined number of shape keypoints associated with the second part, wherein the rendered augmented image is based at least in part on the second plurality of shape keypoints.

6. The computing system of claim 4, wherein the one or more non-transitory computer-readable media comprising computer-executable instructions that when executed by the one or more processors, further cause the computing system to at least:
 generate a three-dimensional model of a second user, wherein the first two-dimensional image comprises the second user wearing the target garment;
 determine a spatial location of a joint of the second user based at least in part on the three-dimensional model of the second user;
 determine a pose estimation of the second user based at least in part on the spatial location of the joint, wherein the rendered augmented image is based at least in part on the pose estimation of the second user.

7. The computing system of claim 4, wherein the one or more non-transitory computer-readable media comprising computer-executable instructions that, when executed by the one or more processors, further cause the computing system to at least:
 access a list comprising a plurality of two-dimensional images of candidate target garments, including the first two-dimensional image of the target garment;
 cause the first two-dimensional image of the target garment to be displayed on a display of a computing device; and
 receive, via the computing device, an input indicating a selection of the first two-dimensional image of the target garment.

8. The computing system of claim 4, wherein the one or more non-transitory computer-readable media comprising computer-executing instructions that, when executed by the one or more processors, further cause the computing system to at least:
 generate a first three-dimensional model of the first user based at least in part on the second two-dimensional image of the first user;
 determine a spatial location of a joint of the first user based at least in part on the first three-dimensional model of the first user; and
 determine a pose estimation of the first user based at least in part on the spatial location of the joint, wherein the rendered augmented image is based at least in part on the pose estimation of the first user.

9. The computing system of claim 4, wherein the one or more non-transitory computer-readable media comprising computer-executable instructions that, when executed by the one or more processors, further cause the computing system to at least:
 determine a first shape keypoint of the first plurality of shape keypoints;
 determine a pixel of the second two-dimensional image that is a nearest pixel in distance to the first shape keypoint; and
 determine, for the first shape keypoint, a first intensity (i) coordinate corresponding to the first part, a first u-coordinate corresponding to a first x-coordinate of the nearest pixel, and a first v-coordinate corresponding to a first y-coordinate of the nearest pixel, wherein the first shape keypoint provides physical characteristic information of the target garment, wherein the rendered augmented image is based at least in part on the first shape keypoint.

10. The computing system of claim 4, wherein the one or more non-transitory computer-readable media comprising computer-executable instructions that, when executed by the one or more processors, further cause the computing system to at least:
 determine a first shape keypoint of the first plurality of shape keypoints;
 determine a set of n-nearest pixels of the second two-dimensional image that are nearest in distance to the first shape keypoint, wherein each pixel of the set of n-nearest pixels comprises a respective x-coordinate, and wherein each pixel of the set of n-nearest pixels comprises a respective y-coordinate;
 determine a first average x-coordinate based at least in part on each pixel of the set of n-nearest pixels;
 determine a first average y-coordinate based at least in part on each pixel of the set of n-nearest pixels; and
 determine, for the first shape keypoint a first intensity (i) coordinate corresponding to the first part, a first u-coordinate corresponding to the first average x-coordinate, and a first v-coordinate corresponding to the first average y-coordinate, and the first shape keypoint providing physical characteristic information of the target garment.

11. The computing system of claim 4, wherein the one or more non-transitory computer-readable media comprising computer-executable instructions that, when executed by the one or more processors, further cause the computing system to at least:

determine a first shape keypoint of the first plurality of shape keypoints;

determine a pixel of the of the second two-dimensional image that is greater than a threshold distance from the first shape keypoint, and determine, for the first shape keypoint, a first intensity (i) coordinate corresponding to the first part, a first x-coordinate, a first y-coordinate, a first u-coordinate corresponding to the first x-coordinate, a first v-coordinate corresponding to the first y-coordinate.

12. The computing system of claim 4, wherein the one or more non-transitory computer-readable media comprising computer-executable instructions that, when executed by the one or more processors, further cause the computing system to at least:

determine a mesh structure associated with the second two-dimensional image, wherein each part of the first plurality of parts comprises a cell of a plurality of cells of the mesh structure:

determine a contour of a first cell of the plurality of cells; and determine a first shape keypoint of the first plurality of shape keypoints based at least in part on the contour of the first cell.

13. The computing system of claim 4, wherein the one or more non-transitory computer-readable media comprising computer-executable instructions that, when executed by the one or more processors, further cause the computing system to at least:

determine a first shape keypoint of the first plurality of shape keypoints;

map the first shape keypoint to an embedding in a latent space;

generate a query vector based at least in part on the embedding;

generate a key vector based at least in part on the embedding;

generate a value vector based at least in part on the query vector and the key vector; and generate a probability distribution for candidate data to be included in the rendered augmented image based at least in part on the value vector.

14. The computing system of claim 4, wherein the one or more non-transitory computer-readable media comprising computer-executable instructions that, when executed by the one or more processors, further cause the computing system to at least:

access physical characteristic information of the target garment from a garment manufacturer database; and determine a characteristic of a pixel to be added to the rendered augmented image based at least in part on the physical characteristic information, wherein the rendered augmented image is based at least in part on the characteristic.

15. The computing system of claim 4, wherein the one or more non-transitory computer-readable media comprising computer-executable instructions that, when executed by the one or more processors, further cause the computing system to at least:

receive a first user-based input as to a first physical characteristic information of the first user; and determine a characteristic of a pixel to be added to the rendered augmented image based at least in part on the physical characteristic information, wherein the rendered augmented image is based at least in part on the characteristic.

16. The computing system of claim 4, wherein the one or more non-transitory computer-readable media comprising computer-executable instructions that, when executed by the one or more processors, further cause the computing system to at least:

receive a first user-based input as to a first physical characteristic information of the first user;

receive a second user-based input as to a second physical characteristic information of the first user;

determine a ratio of the first user-based input to the second user-based input, wherein the rendered augmented image is based at least in part on the ratio.

17. The computing system of claim 4, wherein the one or more non-transitory computer-readable media comprising computer-executable instructions that, when executed by the one or more processors, further cause the computing system to at least:

cause the rendered augmented image to be displayed on a display of a computing device, wherein the first two-dimensional image of the first user is received via the computing device.

18. One or more non-transitory computer-readable media comprising computer-executable instructions that, when executed by the one or more processors, cause a computing system to at least:

receive, at a first machine learning model of a computing system, a query vector generated based at least in part on a first shape keypoint of a first plurality of shape keypoints associated with a first user image, the first plurality of shape keypoints associated with an anatomical body part;

receive, at the machine learning model of the computing system, a key vector generated based at least in part on the first shape keypoint;

arrange, by the first machine learning model of the computing system, a pixel associated with the first shape keypoint on an image of first user using a cross-attention mechanism based at least in part on the query vector and the key vector, the pixel associated with a target garment image;

compare, by the computing system, an arrangement of the pixel to a ground truth arrangement of the pixel using a loss function; and adjust, by the computing system, a first weight of the first machine learning model based at least in part on the loss function.

19. The one or more non-transitory computer-readable media of claim 18, wherein the computer-executable instructions that, when executed by the one or more processors, further cause the computing system to at least:

receive, at the first machine learning model of the computing system, a target garment feature based at least in part on the target garment image;

determine, by the first machine learning model, a characteristic of the pixel based at least in part on the target garment feature.

20. The one or more non-transitory computer-readable media of claim 19, wherein the computer-executable instructions that, when executed by the one or more processors, further cause the computing system to at least:

connect the first machine learning model to a second machine learning model; and train, in parallel to training the first machine learning model, the second machine learning model to extract the target garment feature from the target garment image.

* * * * *